United States Patent [19]

Yeh

[11] Patent Number: 5,509,108

[45] Date of Patent: Apr. 16, 1996

[54] APPARATUS AND METHOD FOR CONTROLLING A PRINTING MACHINE

[75] Inventor: Thomas I. Yeh, Penfield, N.Y.

[73] Assignee: Xerox Corporation, Stamford, Conn.

[21] Appl. No.: 129,496

[22] Filed: Sep. 30, 1993

[51] Int. Cl.⁶ .................................................. G06K 15/00
[52] U.S. Cl. ........................ 395/114; 395/101; 364/550
[58] Field of Search ................... 395/114; 355/204–209, 355/200, 202; 219/216; 364/550

[56] References Cited

U.S. PATENT DOCUMENTS

| | | | |
|---|---|---|---|
| 4,527,247 | 7/1985 | Kaiser et al. | 364/550 |
| 4,615,609 | 10/1986 | Honma | 365/200 |
| 4,874,127 | 10/1989 | Collier | 236/49.5 |
| 4,897,883 | 1/1990 | Harrington | 455/603 |
| 5,194,895 | 3/1993 | Bares | 355/208 |
| 5,309,146 | 5/1994 | Kenet | 340/540 |
| 5,395,042 | 3/1995 | Riley et al. | 236/46 R |

OTHER PUBLICATIONS

Echelon Corporation Lonworks™ Product Line Brief, Motorola Semiconductor Technical Data, 1990, pp. 1–19.
Echelon Corporation, Lonworks™ Applications Primer, Motorola Semiconductor Technical Data, 1990, pp. 1–19.

*Primary Examiner*—Mark R. Powell
*Assistant Examiner*—Tracy M. Legree
*Attorney, Agent, or Firm*—Gary B. Cohen

[57] ABSTRACT

There is provided a control apparatus for a printing machine located in a building with a portion of the building being characterized by an environmental state. The printing machine includes a print machine component, while the control apparatus includes a communication line, operatively coupled with the printing machine, across which signals are transmitted. A sensing arrangement, communicating with the communication line, transmits a signal, representative of the environmental state of the building portion, across the communication line. An interface receives and converts the signal to a control signal, the control signal being used to control the print machine component.

20 Claims, 4 Drawing Sheets

APPARATUS AND METHOD FOR CONTROLLING A PRINTING MACHINE

The present invention relates generally to a technique for controlling a printing machine and, more specifically, to an arrangement that couples a printing machine with a smart building management network for maximizing the operation of the printing machine.

The term "smart building" or "smart office" refers to a control arrangement in which building utilities, such as lights, air conditioners, workstations, etc. are controlled by a central control system, the controller being responsive to sensed events, such as a preselected number of people entering the building or a bank of lights being turned on. In one example, the sensed event based on entering people is achieved through use of a motion sensor.

In practice, each component of the smart building is coupled with a common communication link, such as the power line of the building. One type of smart building can be implemented through employment of a local operating network ("LON"), which LON provides a powerful tool for implementing a distributed system that performs sensing, monitoring, control and other applications. A detailed description of a LON is provided by the following publications:

LONWORKS™ Product Line Brief Motorola
SEMICONDUCTOR Technical Data Echelon
Corporation 1990

LONWORKS™ Applications Primer Motorola
SEMICONDUCTOR Technical Data Echelon
Corporation 1990

Much of the following material is reproduced from the LONWORKS™ Applications Primer ("Primer"). LONs constitute a class of technology that allows intelligent devices, such as actuators and sensors, to communicate with one another through an assortment of communications media using a standard protocol. LONs are made up of intelligent, communication devices, called "nodes", that are logically combined. A node may be a basic wiring device, such as a switch, an analog or digital sensor, an actuator or even a user interface device, such as a display or keypad. A typical node may consist of:

one or more sensors or actuators and associated application hardware, a controller chip, such as that manufactured by the Echelon Corporation and sold under the name NEURON CHIP™, and a transceiver that provides the link to the communication medium.

The nodes communicate with one another across the communication medium with a protocol, one such protocol being sold by Echelon Corporation ("Echelon") and referred to as "LONTALK". In particular, LONTALK is a framework for all of the communications occurring on a LON. LONs that follow the LONTALK protocol are referred to, by Echelon, as "LONWORKS" networks, and nodes using the LONTALK protocol are referred to as LONTALK nodes. Hardware and software tools, suitable for developing a LON using both LONTALK and LONWORKS, is included in a package sold by Echelon and referred to as "LONBUILDER Developer's Workbench" The LON-BUILDER Developer's Workbench provides all of the hardware and software tools needed to compile a program for each node, test it, and then configure and test networks of nodes. Generally, LONWORKS installations require the following steps:

Define the desired functionality as experienced by the enduser;

Select nodes and define where they will be physically placed and how they will be logically connected (This involves defining the connections between the nodes' network variable inputs and outputs as well as selecting the media);

Locate nodes in their proper places and make any necessary connections to application hardware and to network media; and Load nodes with information that establishes the desired logical connections to other nodes (Standard network management commands are used to load a node, via its network connection, with addressing information that defines the node's place in the network and its connections with other nodes).

As shown in the Primer, the smart building concept has been put to use in optimizing the operation of a building. For example, the Primer explains an improved approach for turning lights on and off in an office setting. The Primer, however, does not contemplate the power of using the smart building concept with an "intelligent" apparatus, such as a printing machine. It would be desirable to provide a control arrangement in which operation of one or more printing machines are installed in a smart building arrangement for maximizing their respective operational capacities.

In one aspect of the disclosed embodiment of the present invention there is provided a control apparatus for a printing machine located in a building with a portion of the building being characterized by an environmental state, the printing machine including a print machine component, including: a communication line, operatively coupled with the printing machine, across which signals are transmitted; a sensing arrangement, communicating with the communication line, for transmitting a signal, representative of the environmental state of the building portion, across the communication line; an interface for receiving and converting the signal to a control signal; and a print machine controller, responsive to the interface, for controlling operation of the print machine component as a function of the control signal.

In another aspect of the disclosed embodiment of the present invention there is provided a control apparatus for a printing machine located in a building with an actuatable building component, the printing machine including a print machine component, including: a communication line, operatively coupled with the building component and the printing machine across which signals are transmitted; a building controller, communicating with the actuatable building component and transmitting a signal across the communication line to the printing machine as a function of the actuatable building component being actuated; an interface, disposed intermediate of the building controller and the printing machine, for receiving and converting the signal to a control signal; and a print machine controller, responsive to the interface, for controlling operation of the print machine component as a function of the control signal.

These and other aspects of the invention will become apparent from the following description, the description being used to illustrate a preferred embodiment of the invention when read in conjunction with the accompanying drawings.

Figure 2:
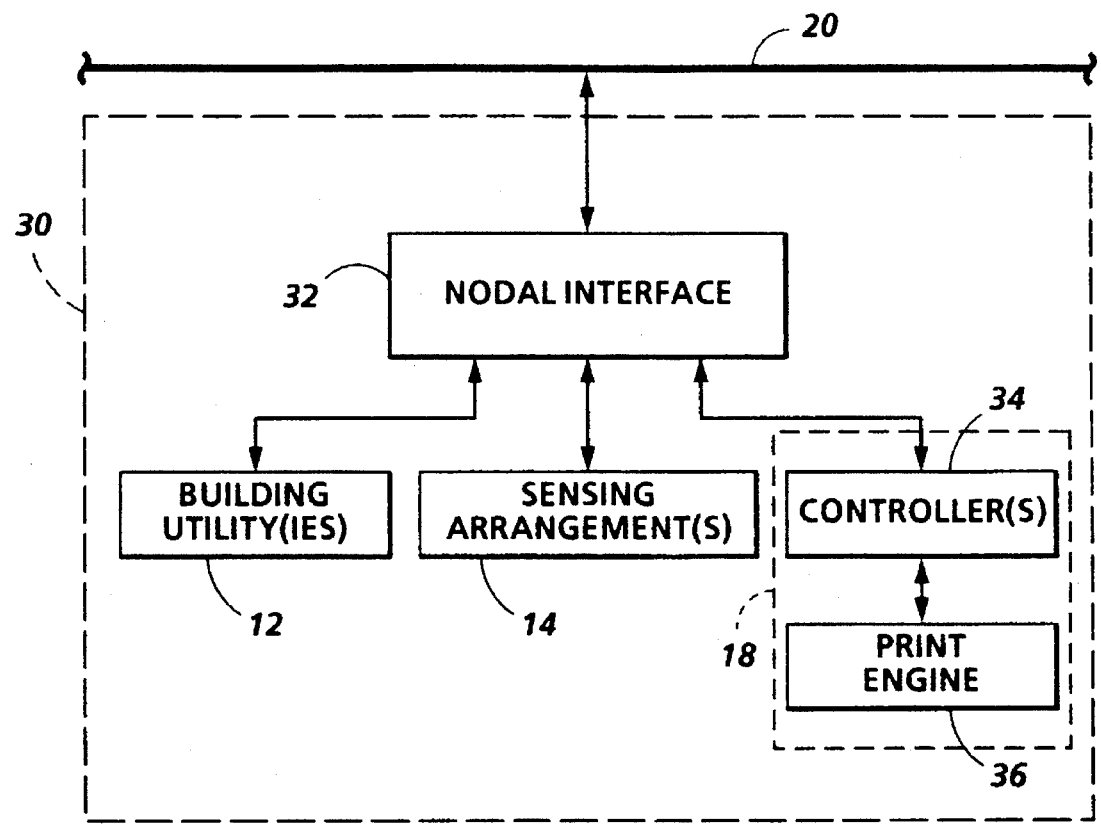
FIG. 2 is a block diagram showing a node in the LON of FIG. 1.
Figure 3:
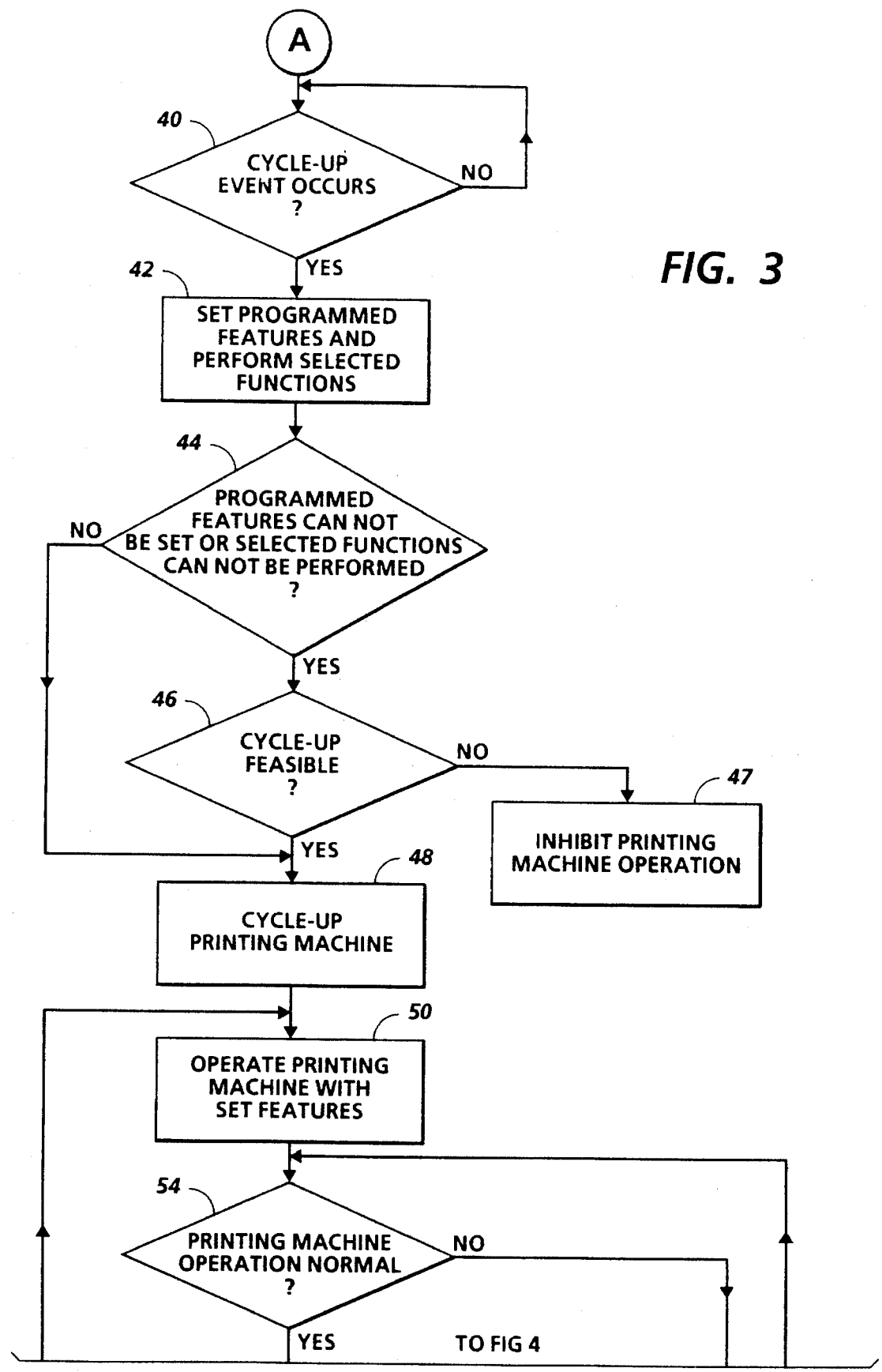
Figure 4:
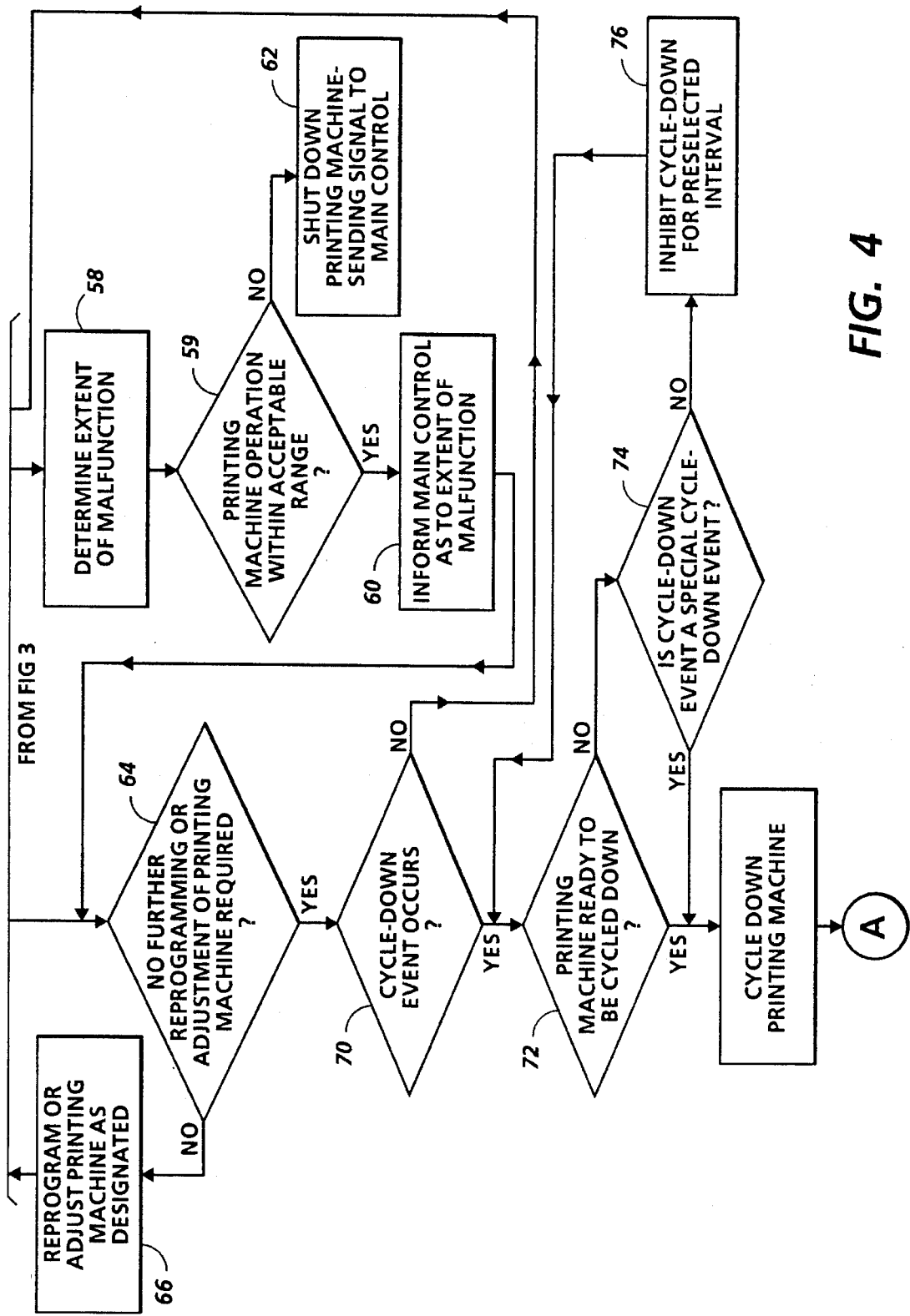

FIG. 3 and 4 conjunctively represent a flow diagram illustrating the operation of a printing machine provided in the node of FIG. 2.

These and other aspects of the invention will become apparent from the following description, the description being used to illustrate a preferred embodiment of the invention when read in conjunction with the accompanying drawings.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
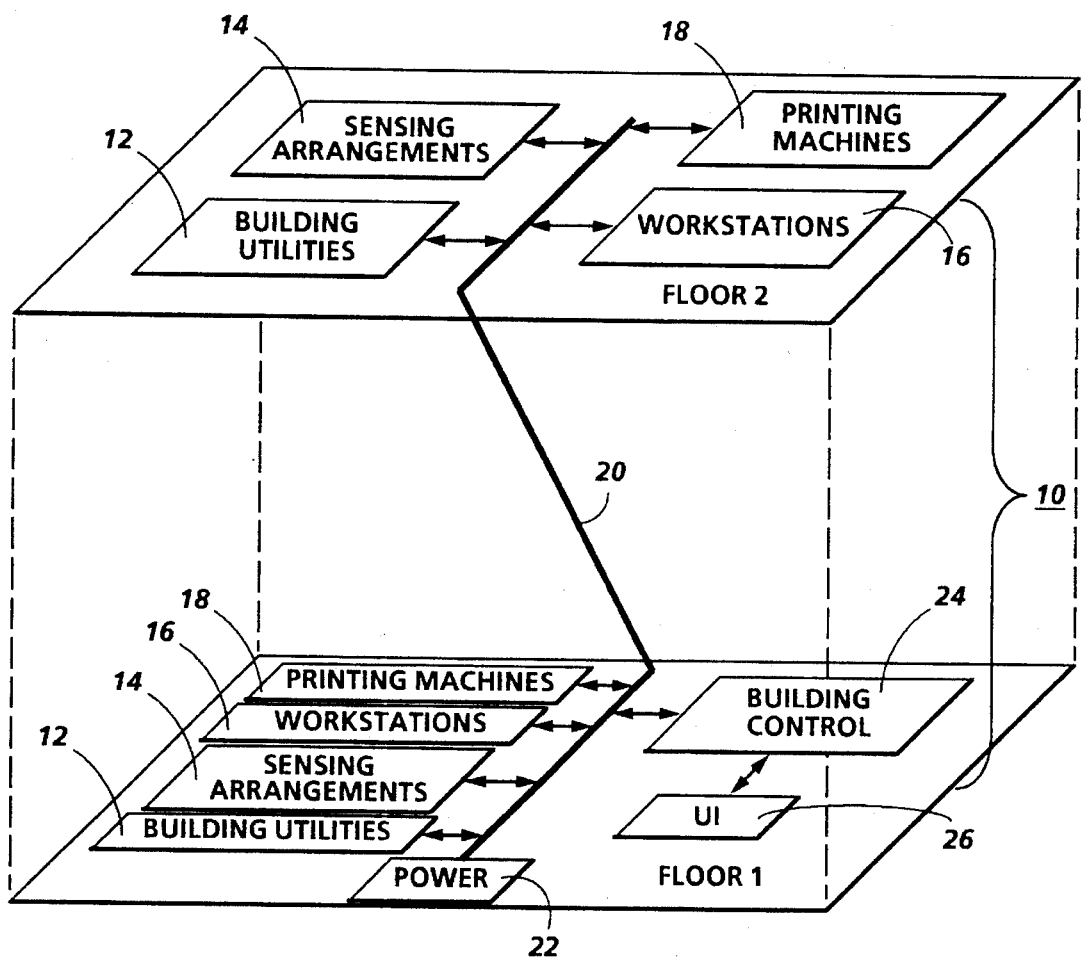
FIG. 1 is a schematic, block diagram of a floor plan for an exemplary smart building in which a local operating network ("LON") is employed.

Referring to FIG. 1, a schematic, exemplary representation of a "smart" office or building is designated by the numeral 10. In the illustrated embodiment of FIG. 1, the office includes two floors, each of which include a plurality of component types which could be employed in a smart office setting. As will be appreciated, the office could include many more than two floors without affecting the concept upon which the present invention is based. The components include—but are not limited to—building utilities 12, sensing arrangements 14, workstations 16 and printing machines 18. For ease of representation, a plurality of components, such as a plurality of printing machines, are shown in one box. In practice, the printing machines may be distributed throughout the first and second floors. The various components are linked together by a communication line 20, which, in the preferred embodiment, comprises an AC power line, which power line is coupled with a conventional AC power source 22. Control of the office components resides in a building control 24, the building control being coupled with the power line 20 and programmable with a user interface ("UI") 26.

The drawing of FIG. 1 does not illustrate an exact relationship between the building components and the power line 20. Indeed, in the preferred embodiment, the various components are clustered in a plurality a nodes. Each node can include a mix of components which may or may not cooperate with one another in operation. Referring to FIG. 2, an exemplary node, including at least one of a building utility 12, a sensing arrangement 14 and a printing machine 18, is designated by the numeral 30. Each of the building components of FIG. 2 is coupled with the power line 20 by way of a nodal interface 32. Preferably the nodal interface 30 includes a transceiver (not shown) and a communications chip (not shown) such as that sold by Echelon Corporation under the registered names of NEURON® 3120 or NEURON® 3150. Additionally, one of the printing machines 18 is shown as including a controller 34 coupled with a print engine 36. It will be appreciated that the controller could comprise one or more processors coupled with a suitable amount of memory and that the print engine could be xerographic-based, ink-based, etc. While the printing machine is shown as a printer, it could also be a copier, a fax machine, or any other suitable printing apparatus In constructing the node 30, each components in the node is assigned with a characteristic address. Accordingly signals can be transmitted to a particular component on an individualized basis. Similarly, signals can be sent from individual components to other locations within the network defined by the power line 20. Two features are provided by this sort of construction, namely 1) signals can be sent to selected components within the node, and 2) the components within the node are defined by their location and not their particular hardware attributes. In view of this latter feature, a component can be replaced within the node without reconfiguring the node.

Referring to FIGS. 3 and 4, operation of the node 30, and its particular significance to at least one of the printing machines 18 will be discussed. Hereinafter, the printing machine of FIG. 2 will be referred to as "the printing machine" In one example of operation, the exemplary printing machine of FIG. 2 is cycled down and remains so until a cycle-up event is detected at step 40. A cycle-up event may include one of a host of events. One cycle-up event may be based on a specific time of the day while another cycle-up event may be based on an event at another address or another node. For example, the cycle-up event could be triggered by a preselected number of people passing by a motion detector disposed near an entrance of the building. Alternatively, the cycle-up event could be triggered by the building lights being actuated in any part of the building, including the room in which the printing machine is located. It should be appreciated that a light sensor could be mounted on the machine for actuating the machine or the building control 24 could turn on the machine upon receiving a signal from a light sensor at a given address.

In the preferred embodiment, once a cycle-up event occurs, a signal is transmitted from a building component, such as a sensing arrangement 14 or the building control 24, to the nodal interface 32. Essentially, the signal, with its attendant location designator (e.g. address) is "filtered" with the nodal interface 32 and transmitted to the controller 34. In one example, the signal is an analog signal transmitted to the nodal interface with an AC carrier signal, and the filtering is achieved with amplitude or frequency modulation. Alternatively, the signal could be a digital signal transmitted along the carrier. Further information regarding the transmission of control signals across communication lines may be found in U.S. Pat. No. 4,897,883, the pertinent portions of which are incorporated herein.

At step 42, sets various features and performs selected functions. In the case of a xerographic print engine, voltages could be set to facilitate, among other functions, charging, developing, transferring and fusing. Additionally, the building control 24 could direct the printing machine to "lock out" certain features so that they are not available to machine users. Pursuant to setting features of the print engine, various selected functions, such as diagnostic functions, can be performed on the print engine. In one example, a test patch is employed to determine whether the print engine is operating within an acceptable range. In the event that a feature cannot be set on the print engine or a function cannot be performed (step 44), cycle-up of the machine is temporarily inhibited and a message is sent to the building control 24. In turn, the main control determines, on the basis of what it knows about the print engine, whether cycle-up is feasible (step 46). If cycle-up is not feasible, then machine operation, via step 47, is inhibited. Provided that the machine can be operated within an acceptable range, the process proceeds to steps 48 and 50 where the printing machine is started up and then operated.

At preselected intervals, operation of the printing machine, via step 54, is examined. When a malfunction occurs in the printing machine, the extent to which the printing machine is malfunctioning is determined, via step 56, at the printing machine or the building control. In one embodiment, the malfunctioning machine is provided with the ability to determine, via steps 58, 59 whether its operation is within an acceptable range, i.e. the printing machine can perform self-diagnostics and determine the extent to which it is malfunctioning. Alternatively, the building control could be provided with configuration information about each available printing machine in the building so that, upon receiving data from a malfunctioning machine, the building control could determine if the machine should be partially or completely shut down. In the preferred embodiment, the printing machine either informs the building control of the extent of malfunction (step 60) or shuts down (partially or completely) (step 62) and sends a message to the building control 24. An example of step 62 can arise when a given printing machine, with a finisher, loses its ability to finish prints. In this example, the given printing machine would shut down its finisher and send a message to the building control indicating that finishing capability is not available. Additionally, the building control could be programmed to send a message to predesignated nodes, with displays, to indicate that the given printing machine cannot finish prints.

Assuming that operation of the printing machine 18 (FIG. 2) is normal, or within an acceptable range, the printing machine can be reprogrammed or adjusted as required (step 64). In one embodiment, such reprogramming can be performed advantageously with the building control. As indicated above, the building control can be used to lock out certain features on the printing machine. At step 64 one or more of the locked-out features could be made available. In particular, the building control would allow a user of the printing machine, with the appropriate level of security clearance, to use the locked-out feature(s). Additionally, the adjustment step can be used to compensate for adverse environmental conditions in the vicinity of the printing machine. In particular, the operation certain printing machines, such as xerographic and thermal ink jet printing machines, varies as a function of environmental conditions, such as temperature, relative humidity, etc.

In the preferred embodiment the printing machine of FIG. 2, monitors pertinent environmental conditions by way of the building control 24. That is, the building control continually informs the printing machine as to the state of the adjacent environmental conditions. Accordingly, the printing machine, which knows when the conditions are less than optimum for printing, can ask the building control to alter an environmental condition of the building. If the building control cannot alter the environmental condition, then the controller 32 can facilitate compensation. In one example, when the temperature external to the printing machine is too high, and the printing machine possesses a cooling device, the controller can turn on the cooling device when the temperature cannot be lowered sufficiently by the building control. In another example, when the relative humidity varies from an acceptable level, and the building control cannot adjust the relative humidity around the printing machine to a suitable level, then the printing machine can adjust certain operating parameters.

At step 70, the printing machine checks for a cycle-down event. For some printing machines, the cycle down event will depend on the number of people in the vicinity of the machine or the time of day. Preferably, the cycle-down event is monitored by the building control 24 which has access to various sensors near or around the printing machine. In one example, the printing machine may be ordered to cycle down when a light sensor near the printing machine indicates that the light level has dropped below a preselected threshold. Alternatively, the printing machine can be cycled down as a function of the motion sensed in a preselected area adjacent the printing machine. Since the building 10 is a smart building there are many conceivable events which could be used to trigger the cycle-down event. Moreover, one event could be used as a cycle-up event while another event could be used as a cycle-down event. For example, a motion sensor at the main door of the building 10 could be used to trigger a cycle-up event while the deactivation of lights near the printing machine could be used to trigger a cycle-down event.

In some instances, it may be desirable to provide the printing machine with the capability to override a signal from the building control ordering the printing machine to cycle down. For example, the printing machine may be in the process of printing a print job of significant size upon receiving a cycle down signal. In this case it would be desirable to give the printing machine a little more time to finish its task. In another example it may desirable to operate a printing machine even when the building is relatively empty. This sort of situation may arise on a weekend when building traffic is low, but use of the printing machine is still required. At step 72, the printing machine is provided with the capacity to decide whether it desires to cycle down upon being ordered by the building control to do so. It can be recognized that there are instances when it is undesirable to permit the printing machine to override a cycle down signal. For instance, during periods when a building must be shut down, such as during a severe snow storm, there would be no good reason for keeping the printing machine cycled-up. Accordingly, as illustrated at step 74, certain special cycle-down events should cause the printing machine to cycle-down under any circumstances. Under normal circumstances, the printing machine is maintained in a cycled-up condition for a preselected interval (step 76) if it requires more time. As long as the printing machine needs additional time, the process cycles through steps 72, 74 and 76 until the printing machine is ready to be cycled down at step 78.

Numerous features of the above-disclosed embodiment will be appreciated by those skilled in the art. In particular, using a printing machine in a smart building maximizes the operation of the printing machine by creating a high level of interactivity between the printing machine and the building. First, the high level of interactivity between the printing machine and the building allows for necessary adjustments in the surrounding environment of the printing machine or in the printing machine itself. Second the high level of interactivity between the printing machine and the building permits dynamic configuration of the printing machine. In one example, certain features can be "locked-out" during one time interval and selectively provided during another time interval. Third, the high level of interactivity between the printing machine and the building permits users to be informed as to the operational status of any particular printing machine. For example, a user can determine, at a workstation or display disposed remotely of a given printing machine, that the given printing machine is not cycled-up or cannot provide a particular feature. Finally, the high level of interactivity between the printing machine and the building permits the printing machine to respond to the needs of the building and vice versa. For example, the printing machine can be cycled down in case of a building emergency and the printing machine can work beyond its normally allotted time when the printing machine is not ready, for one reason or another, to be cycled-down.

What is claimed is:

1. A control apparatus for a printing machine located in a building with a portion of the building being characterized by an environmental state, the printing machine including a print machine component, comprising:

a communication line, operatively coupled with the printing machine, across which signals are transmitted;

sensory input means, communicating with said communication line, for transmitting a control signal, representative of the environmental state of the building portion, across said communication line;

an interface for receiving and converting the signal to a control signal;

a print machine controller, responsive to said interface, for controlling operation of the print machine component as a function of the control signal;

a plurality of print machine controllers; and a plurality of print machine components respectively coupled with selected ones of said plurality of print machine controllers, one of said plurality of print machine controllers being dedicated to receiving the control signal and communicating the information imparted by the control signal to a selected one of the other print machine controllers.

2. The control apparatus of claim 1, wherein said communication line includes an AC power line across which a power signal is transmitted, the signal and the power signal are transmitted across said communication line and said interface includes a transceiving apparatus for converting a combination of the signal and the power signal into the control signal.

3. The control apparatus of claim 1, wherein said sensory input means comprises:

a building controller; and a sensor for transmitting sensory information regarding the environmental state of the building portion to said building controller.

4. The control apparatus of claim 3, wherein said print machine controller, in response to receiving the control signal, transmits a signal to said building controller requesting that said building controller change the environmental state of the building portion.

5. The control apparatus of claim 1, wherein said sensory input means is disposed remotely of the printing machine.

6. The control apparatus of claim 1, in which said print machine component is characterized by an operating parameter, wherein:

the building portion is adjacent the printing machine;

said sensory input means includes a sensor for detecting a humidity level of the building portion;

the control signal represents the detected humidity level; and the operating parameter of said print machine component is adjusted when the humidity level varies from a predetermined level.

7. The control apparatus of claim 1, wherein said print machine controller renders the print machine component inoperative when said print machine controller receives the control signal.

8. A control apparatus for a printing machine located in a building with a portion of the building being characterized by an environmental state, the building portion being adjacent the printing machine, the printing machine including a print machine component, the print machine component including an actuatable cooling apparatus, comprising:

a communication line, operatively coupled with the printing machine, across which signals are transmitted;

sensory input means, communicating with said communication line, for transmitting a control signal, representative of the environmental state of the building portion, across said communication line, said sensory input means including a sensor for detecting a temperature of the building actuatable cooling apparatus being actuated for a selected time interval when the temperature varies from a predetermined level;

an interface for receiving and converting the signal to a control signal; and a print machine controller, responsive to said interface, for controlling operation of the print machine component as a function of the control signal.

9. A control apparatus for a printing machine located in a building with a portion of the building being characterized by an environmental state, the printing machine including a print machine component, comprising:

a communication line, operatively coupled with the printing machine, across which signals are transmitted;

sensory input means, communicating with said communication line, for transmitting a control signal, representative of the environmental state of the building portion, across said communication line;

an interface for receiving and converting the signal to a control signal;

a print machine controller, responsive to said interface, for controlling operation of the print machine component as a function of the control signal;

wherein the control signal directs the print machine component to perform a selected task and, in response to a condition of the print machine component, performance of the selected task is delayed.

10. The control apparatus of claim 9, wherein said communication line includes an AC power line across which a power signal is transmitted, the signal and the power signal are transmitted across said communication line and said interface includes a transceiving apparatus for converting a combination of the signal and the power signal into the control signal.

11. The control apparatus of claim 9, wherein said sensory input means comprises:

a building controller; and a sensor for transmitting sensory information regarding the environmental state of the building portion to said building controller.

12. The control apparatus of claim 11, wherein said print machine controller, in response to receiving the control signal, transmits a signal to said building controller requesting that said building controller change the environmental state of the building portion.

13. The control apparatus of claim 9, wherein said sensory input means is disposed remotely of the printing machine.

14. The control apparatus of claim 9, further comprising:

a plurality of print machine controllers; and a plurality of print machine components respectively coupled with selected ones of said plurality of print machine controllers, one of said plurality of print machine controllers being dedicated to receiving the control signal and communicating the information imparted by the control signal to a selected one of the other print machine controllers.

15. The control apparatus of claim 9, wherein:

the building portion is adjacent the printing machine;

said sensory input means includes a sensor for detecting a temperature of the building portion; and the control signal represents the detected temperature.

16. The control apparatus of claim 15, wherein:

said print machine component comprises an actuatable cooling apparatus; and said actuatable cooling apparatus is actuated for a selected time interval when the temperature varies from a predetermined level.

17. The control apparatus of claim 9, in which said print machine component is characterized by an operating parameter, wherein:

the building portion is adjacent the printing machine;

said sensory input means includes a sensor for detecting a humidity level of the building portion;

the control signal represents the detected humidity level; and the operating parameter of said print machine component is adjusted when the humidity level varies from a predetermined level.

18. The control apparatus of claim 9, wherein said print machine controller renders the print machine component inoperative when said print machine controller receives the control signal.

19. A control apparatus for a printing machine located in a building with an actuatable building component, the printing machine including a print machine component and the actuatable building component comprising one or more lights, comprising:

a communication line, operatively coupled with the building component and the printing machine, across which signals are transmitted;

a building controller, communicating with the actuatable building component and transmitting a signal across said communication line to the printing machine as a function of the actuatable building component being actuated;

an interface, disposed intermediate of said building controller and the printing machine, for receiving and converting the signal to a control signal; and a print machine controller, responsive to said interface, for controlling operation of the print machine component as a function of the control signal.

20. The control apparatus of claim 19, wherein said communication line includes an AC power line across which a power signal is transmitted, the signal and the power signal are transmitted across said communication line and said interface includes a transceiving apparatus for converting a combination of the signal and the power signal into the control signal.

* * * * *